United States Patent
Son

(10) Patent No.: US 12,275,332 B2
(45) Date of Patent: Apr. 15, 2025

(54) VEHICLE HAVING ELECTRIC MOTOR AND METHOD OF CONTROLLING BRAKE LAMP FOR THE SAME

(71) Applicants: Hyundai Motor Company, Seoul (KR); Kia Corporation, Seoul (KR)

(72) Inventor: Hui Un Son, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 294 days.

(21) Appl. No.: 17/715,615

(22) Filed: Apr. 7, 2022

(65) Prior Publication Data
US 2022/0402367 A1 Dec. 22, 2022

(30) Foreign Application Priority Data
Jun. 21, 2021 (KR) .......... 10-2021-0079904

(51) Int. Cl.
- *B60L 7/18* (2006.01)
- *B60L 1/14* (2006.01)
- *B60Q 1/44* (2006.01)

(52) U.S. Cl.
CPC ............. *B60L 7/18* (2013.01); *B60L 1/14* (2013.01); *B60Q 1/44* (2013.01)

(58) Field of Classification Search
CPC ...... B60L 7/18; B60L 1/14; B60L 7/10; B60L 15/2009; B60L 15/2063; B60L 2260/24; B60Q 1/44; B60Q 2300/43; B60T 17/22
See application file for complete search history.

(56) References Cited

U.S. PATENT DOCUMENTS

| | | | | |
|---|---|---|---|---|
| 2013/0289874 A1* | 10/2013 | Taguchi | .............. | G01C 21/34 701/400 |
| 2017/0369055 A1* | 12/2017 | Saigusa | .............. | G08G 1/096775 |
| 2018/0201182 A1* | 7/2018 | Zhu | .............. | B60Q 1/46 |
| 2018/0251116 A1* | 9/2018 | Cho | .............. | B60W 30/18127 |
| 2019/0210516 A1* | 7/2019 | Sata | .............. | G08G 1/096775 |

FOREIGN PATENT DOCUMENTS

| | | | | | |
|---|---|---|---|---|---|
| JP | 2016139282 A | * | 8/2016 | | |
| JP | 6092272 B2 | * | 3/2017 | .............. | B60Q 9/00 |
| JP | 2018113757 A | * | 7/2018 | | |
| KR | 20200059376 A | * | 5/2020 | .............. | B60T 8/321 |

OTHER PUBLICATIONS

English translation of Mizui (JP 2016139282) (Year: 2016).*
English translation of Lee et al. (KR 20200059376) (Year: 2020).*
English translation of JP 6092272 (Year: 2017).*

* cited by examiner

*Primary Examiner* — James M McPherson
*Assistant Examiner* — Kyle J Kingsland
(74) *Attorney, Agent, or Firm* — SLATER MATSIL, LLP

(57) ABSTRACT

An embodiment method of controlling a brake lamp of a vehicle equipped with an electric motor as a power source includes determining a position of a following vehicle when decelerating through regenerative braking in a coasting situation and performing at least one of correction of an ON threshold according to deceleration or control of regenerative braking torque for deceleration variation in response to the determined position of the following vehicle being in one of a plurality of regions set according to a distance from a rear of the vehicle.

18 Claims, 7 Drawing Sheets

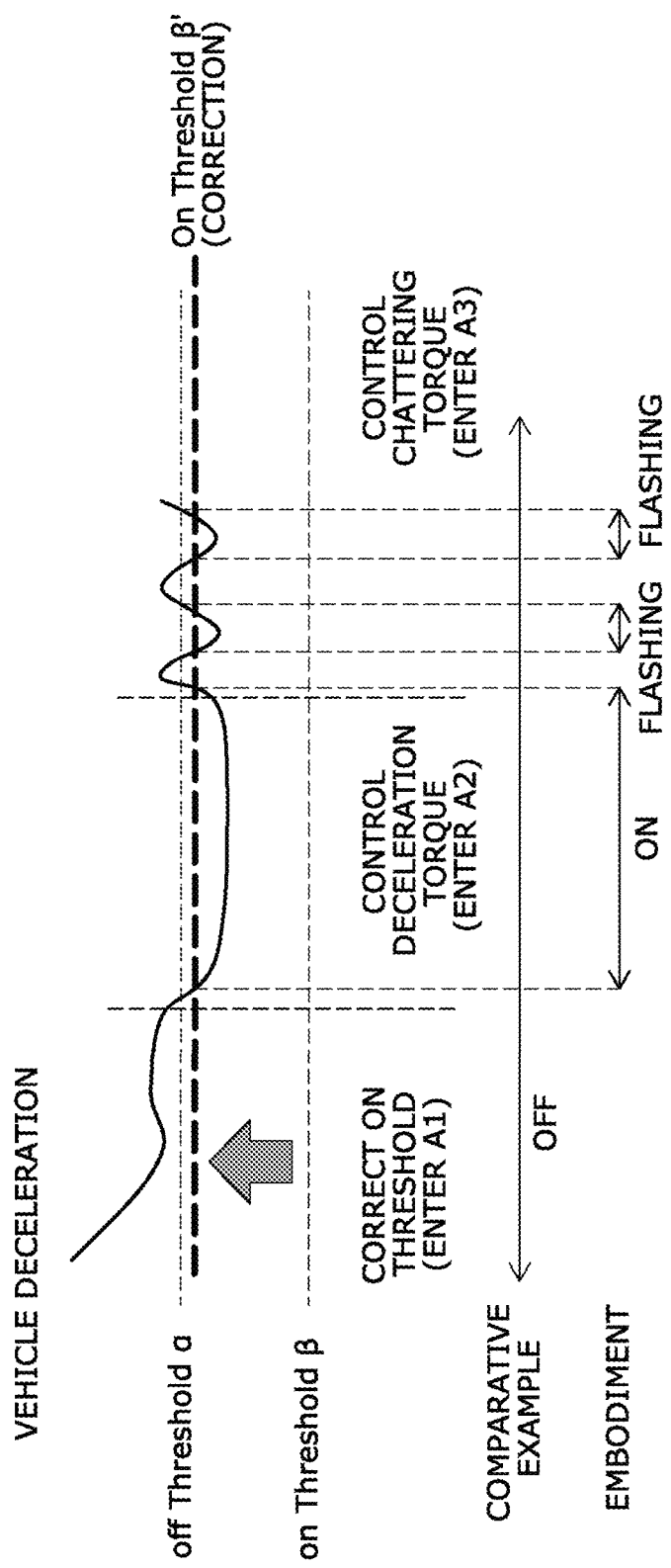

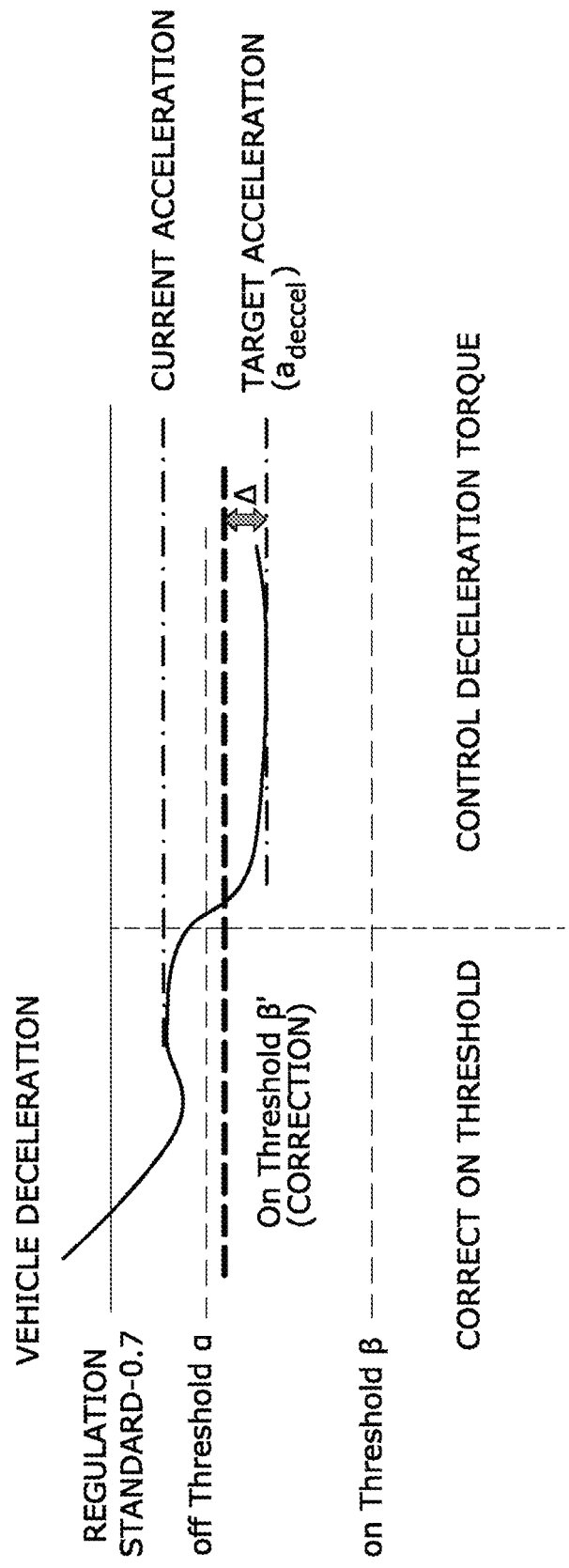

VEHICLE HAVING ELECTRIC MOTOR AND METHOD OF CONTROLLING BRAKE LAMP FOR THE SAME

CROSS-REFERENCE TO RELATED APPLICATIONS

This application claims the benefit of Korean Patent Application No. 10-2021-0079904, filed on Jun. 21, 2021, which application is hereby incorporated herein by reference.

TECHNICAL FIELD

The present invention relates to a vehicle having an electric motor and a method of controlling a brake lamp for the same.

BACKGROUND

The term "coasting" is defined in a dictionary as continuous driving using inertia of motion without application of driving force, and generally refers to driving in a state in which an accelerator pedal (APS) and a brake pedal (BPS) are not operated.

The torque applied to a drive shaft when coasting is performed in this way may be referred to as inertia torque or coasting torque. In a typical internal combustion engine vehicle, idle torque of an engine is transmitted to the drive shaft by a torque converter and a transmission even when the APS and the BPS are not operated. This torque is also called creep torque.

During coasting, creep torque is transmitted to the drive shaft by the engine, and on the other hand, a driving load according to a vehicle speed acts in the opposite direction to the creep torque, and the sum of the driving load and the creep torque constitutes the inertia torque, which will be described with reference to FIG. 1.

FIG. 1 illustrates an example of a relationship between a coasting torque and a vehicle speed when coasting is performed in a general vehicle.

Referring to FIG. 1, when the vehicle speed is low, the transmission is generally in a low gear. Therefore, when an input gear speed of the transmission is lower than the idle RPM of the engine, the idle torque of the engine is transmitted and the vehicle is propelled forward only by the creep torque. On the other hand, at a high vehicle speed, the transmission is in a relatively high gear. Thus, when the input gear speed of the transmission becomes higher than the idle RPM of the engine, engine drag due to cutting of the supply of fuel thereto is transmitted, and coasting torque is generated.

Meanwhile, as interest in the environment has recently increased, many developments have been made on a hybrid electric vehicle (HEV) or an electric vehicle (EV) using an electric motor as a driving source.

In a vehicle equipped with such an electric motor, there is no engine, or the engine is not constantly turned ON, and thus creep torque is not generated by the engine. However, in order to realize characteristics of a general internal combustion engine, control for generating a creep torque by driving a motor is usually performed. Accordingly, in a vehicle equipped with an electric motor, similar to FIG. 1, in a low-speed situation, forward torque of the idling thrust of the internal combustion engine and the torque multiplication effect of the torque converter is simulated, and in a high-speed situation, the reverse torque caused by engine drag when supply of fuel is interrupted is simulated. In this way, a region in which the forward torque is simulated may be referred to as a creep region, and a region in which the reverse torque is simulated may be referred to as a coasting region. In this instance, the reverse torque may be implemented as regenerative braking.

In a vehicle having an electric motor as a power source, such as an HEV or an EV, when braking, the kinetic energy of the vehicle may be converted into electrical energy to perform braking by operating the motor along with an existing hydraulic friction brake as a generator. This type of braking is referred to as regenerative braking.

In some currently available eco-friendly vehicles, there is a manner of simultaneously realizing both driving enjoyment and improving real-world fuel efficiency by using a paddle shift lever to change the amount of regenerative braking, that is, a coasting level.

FIG. 2 is a diagram describing the general concept of a coasting level.

Referring to FIG. 2, the relationship between the vehicle speed and the total torque applied to an axle illustrated in FIG. 1 is illustrated for each of five different coasting torques. Specifically, each time a '−' side of the paddle shift lever is pulled once, the amount of regenerative braking increases by one step and vehicle deceleration increases, and each time a '+' side thereof is pulled once, the amount of regenerative braking decreases by one step and vehicle deceleration decreases. Accordingly, as the coasting level is higher and the vehicle speed is lower, the greater deceleration is generated in the vehicle due to regenerative braking.

Recently, a smart regenerative braking system, which automatically controls a coasting level according to a road slope or a driving state of a surrounding vehicle, has been introduced.

Meanwhile, there is technology referred to as one-pedal driving, which is a function activated when an electronic gear shifter is placed at a specific position. Acceleration and deceleration may be controlled using only the APS, without operating the BPS. Further, it is possible to stop the vehicle by completely removing a foot from the APS. This function uses deceleration due to regenerative braking.

However, as the number of vehicles generating deceleration through regenerative braking such as eco-friendly vehicles has increased in recent years, regulations pertaining to lighting standards for brake lamps according to deceleration have been prepared. Specifically, paragraph 5.2.22.4 of the ECE R-13H regulation stipulates that a brake lamp needs to be operated (turned ON and OFF) according to vehicle deceleration values defined in Table 1 below in the case of a vehicle to which an electric regenerative braking system (e-Braking), which generates a retarding force when the APS is released, is applied.

TABLE 1

| Deceleration | Operating Standard | Remark |
| --- | --- | --- |
| Deceleration ≤ 0.7 | Must not be turned ON | — |
| 0.7 < deceleration ≤ 1.3 | Turning ON allowed | Before deceleration at deceleration < 0.7 m/s$^2$ |
| 1.3 < deceleration | Must be turned ON | |

The manner in which the brake lamp is turned ON and OFF according to this regulation will be described with reference to FIG. 3.

FIG. 3 is a diagram describing vehicle deceleration according to a regulation for regenerative braking devices and whether the brake lamp is turned ON.

Referring to FIG. 3, operation of the brake lamp by regenerative braking is performed by setting an OFF threshold "α" and an ON threshold "β" within a regulation standard. The standard is determined through testing in consideration of safety of a driver of a following vehicle. At this time, by taking a hysteresis margin "Δ" as a difference between α and β, frequent turning ON and OFF may be prevented when deceleration of the vehicle due to regenerative braking changes near reference deceleration.

For example, as illustrated in FIG. 3, in a section ① in which deceleration of the vehicle is greater than or equal to β, the brake lamp is turned OFF. In addition, in a section ② in which the deceleration of the vehicle is less than β, a controller that controls whether the brake lamp is turned ON and OFF by regenerative braking sets a request for turning ON of the brake lamp by regenerative braking, and the request for turning ON is canceled (reset) in a section ③ in which the deceleration falls below α.

Finally, in a section in which turning ON or OFF is stipulated in the regulation (that is, 0.7<deceleration≤1.3), it is common for vehicle manufacturers to reduce chattering by tuning the above-mentioned margin to a fixed value, and thus there is basically no change in ON/OFF control based on a deceleration value detected in the vehicle.

However, the brake lamp is actually turned ON only when sufficient deceleration is generated by the above-described hysteresis margin. Therefore, until then, the brake lamp may not be turned ON even when the vehicle speed is reduced. As a result, there is a problem in that an accident may occur when the following vehicle is close. In particular, in many cases, an electric vehicle has a wedge-shaped design to reduce air resistance. Therefore, a difference in height from a rear of a roof to a trunk lid is not large, and thus a vertical area of a rear window is small. Therefore, it is not easy for a driver of a subject vehicle to verify whether the following vehicle is nearby, so that control of the brake lamp by applying the margin to the deceleration becomes more problematic.

SUMMARY

The present invention relates to a vehicle having an electric motor and a method of controlling a brake lamp for the same. Particular embodiments relate to a vehicle having an electric motor capable of inducing a following vehicle to maintain a safe distance through operation control of a brake lamp according to regenerative braking, and a method of controlling the brake lamp for the same.

Accordingly, embodiments of the present invention are directed to a vehicle having an electric motor and a method of controlling a brake lamp for the same that substantially obviate one or more problems due to limitations and disadvantages of the related art.

An embodiment of the present invention provides a vehicle having an electric motor capable of controlling a brake lamp that may induce a following vehicle to maintain a safe distance, and a method of controlling the brake lamp for the same.

Additional advantages, objects, and features of embodiments of the invention will be set forth in part in the description which follows and in part will become apparent to those having ordinary skill in the art upon examination of the following or may be learned from practice of the invention. The objectives and other advantages of embodiments of the invention may be realized and attained by the structure particularly pointed out in the written description and claims hereof as well as the appended drawings.

To achieve these objects and other advantages and in accordance with the purpose of embodiments of the invention, as embodied and broadly described herein, a method of controlling a brake lamp of an electric vehicle equipped with an electric motor as a power source includes determining a position of a following vehicle when decelerating through regenerative braking in a situation of coasting, and performing at least one of correction of an ON threshold according to deceleration or control of regenerative braking torque for deceleration variation if the following vehicle is located in one of a plurality of regions set according to a distance from a rear of the electric vehicle as a result of the determination.

In another embodiment of the present invention, an electric vehicle equipped with an electric motor as a power source includes a brake lamp, a rear sensor, and a controller configured to control the brake lamp based on deceleration during regenerative braking through the electric motor in a situation of coasting, in which the controller determines a position of a following vehicle through the rear sensor when decelerating through regenerative braking in the coasting situation, and performs at least one of correction of an ON threshold according to deceleration or control of regenerative braking torque for deceleration variation when the following vehicle is located in one of a plurality of regions set according to a distance from a rear of the electric vehicle as a result of the determination.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 3 is a diagram describing vehicle deceleration according to a regulation for regenerative braking devices and whether a brake lamp is turned ON;

FIG. 6A is a diagram describing a concept of a brake lamp control in each region according to an embodiment of the present invention through comparison with a comparative example;

FIG. 6B is a diagram describing deceleration torque control in a second region according to an embodiment of the present invention.

DETAILED DESCRIPTION OF ILLUSTRATIVE EMBODIMENTS

Figure 1:
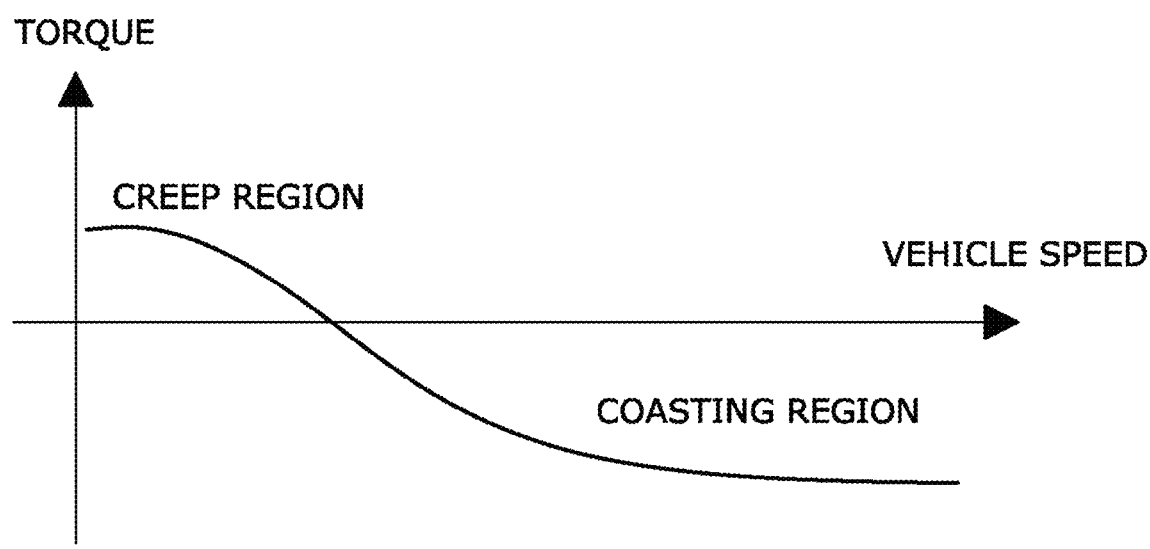
FIG. 1 illustrates an example of a relationship between a coasting torque and a vehicle speed when coasting is performed in a general vehicle.

Hereinafter, with reference to the accompanying drawings, embodiments of the present invention will be described in detail so that those of ordinary skill in the art may easily carry out the present invention. However, the present invention may be implemented in several different forms, and is not limited to the embodiments described herein. Further, in order to clearly describe embodiments of the present invention in the drawings, parts irrelevant to the description are omitted, and similar reference symbols are attached to similar parts throughout the specification.

Throughout the specification, when a part "includes" a certain element, it means that other elements may be further included, rather than being excluded, unless otherwise stated. In addition, parts indicated by the same reference symbols throughout the specification refer to the same elements.

In addition, in the following description, it will be obvious that deceleration, which is a standard for turning ON a brake lamp by regenerative braking, may be expressed as acceleration by changing the sign.

According to an embodiment of the present invention, in the case where another vehicle is present behind a subject vehicle when deceleration is generated due to regenerative braking, it is suggested to first correct an ON threshold applied in a regenerative braking situation by coasting torque based on a distance from the vehicle to another vehicle so as to be prepared to turn the brake lamp ON at low deceleration compared to a default ON threshold. In addition, when another vehicle approaches closer, it is suggested to perform regenerative braking torque control for deceleration variation. For example, it is suggested that the brake lamp be turned ON by controlling the regenerative braking torque so that the deceleration exceeds the ON threshold, and that the deceleration be controlled so that chattering occurs in the brake lamp when another vehicle comes closer. In this way, the driver of the following vehicle may be progressively made aware of deceleration of the subject vehicle in consideration of the distance from the following vehicle, and thus it is possible to induce the following vehicle to maintain a safe distance.

It is assumed that a vehicle having an electric motor applied to the embodiment is an HEV. However, this assumption is for convenience of description, and application to an electric vehicle such as an EV or a fuel cell electric vehicle (FCEV) is obviously possible.

Figure 4:
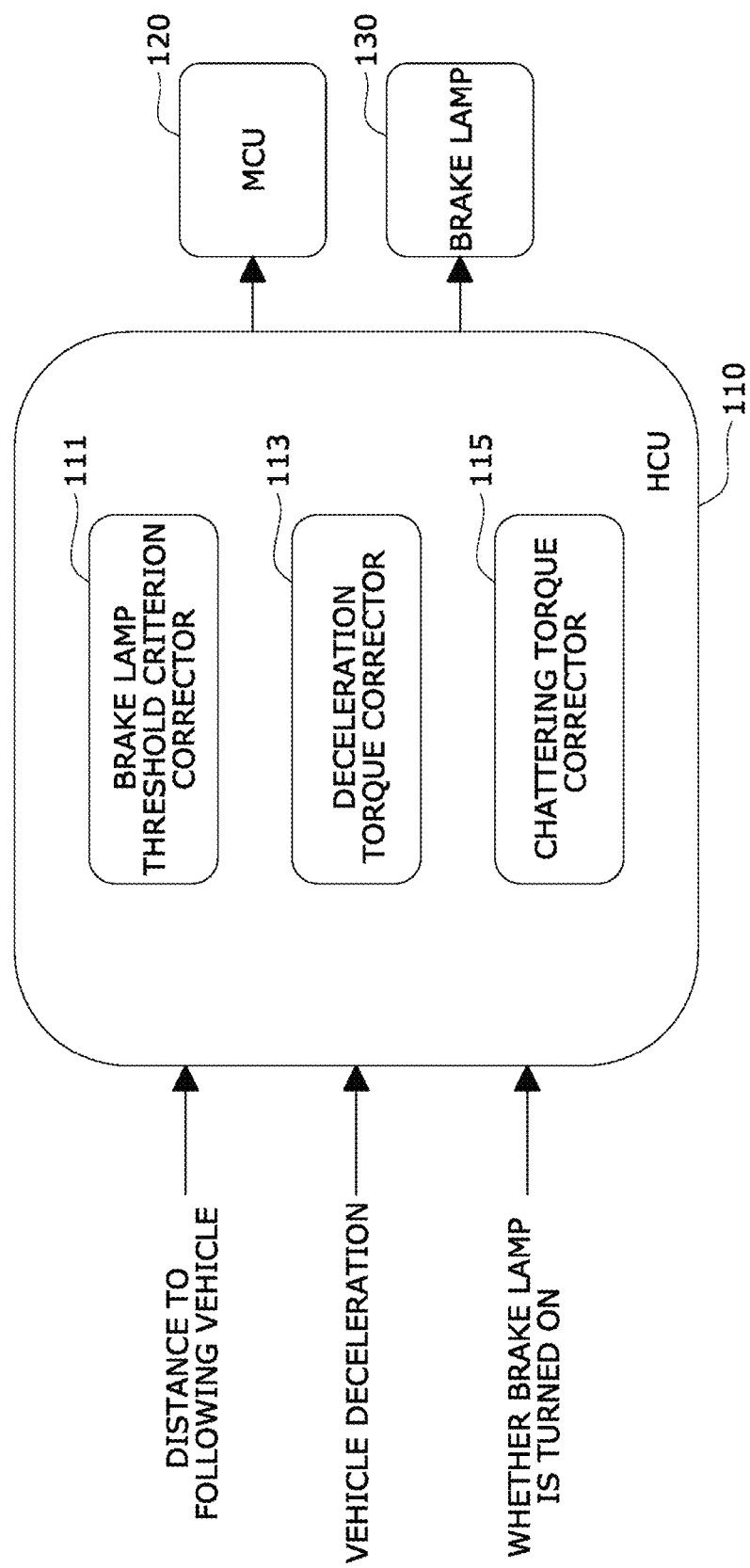
FIG. 4 illustrates an example of a vehicle configuration according to an embodiment of the present invention.

FIG. 4 illustrates an example of a vehicle configuration according to an embodiment of the present invention.

Referring to FIG. 4, the vehicle according to the embodiment may include a hybrid control unit (HCU) no, a motor control unit (MCU) 120, and a brake lamp 130. Obviously, the elements illustrated in FIG. 4 are those that are most closely related to the embodiment, and it will be apparent to those skilled in the art that an actual vehicle may include more elements.

The HCU no performs overall control of a powertrain mounted in the HEV, and may include a brake lamp threshold criterion corrector 111, a deceleration torque corrector 113, and a chattering torque corrector 115 to control the brake lamp in consideration of a distance to the following vehicle in relation to the present embodiment.

In addition, the HCU no may have, as input information, a distance to the following vehicle indicating a distance from the following vehicle, vehicle deceleration due to regenerative braking, and information about whether or not the brake lamp is turned ON. Here, the input information may be information acquired by the HCU no through self-calculation based on other types of input information, or information acquired through an external controller or sensor. For example, the distance to the following vehicle may be acquired through a distance detection sensor such as an ultrasonic sensor, LIDAR, or RADAR, or a camera, or acquired via another controller that manages information acquired from the distance detection sensor, for example, an advanced driver assistance system (ADAS) controller. In addition, the vehicle deceleration information may be acquired through an acceleration sensor, may be acquired by applying correction such as predetermined filtering to the information obtained through the acceleration sensor, and may be calculated based on the mass of the vehicle and the regenerative braking torque. Further, a combination of the above-mentioned methods may be possible. In addition, whether or not to turn ON the brake lamp may be determined by comparing the vehicle deceleration with the brake lamp threshold, but is not limited thereto.

When the HCU no transmits a torque command corresponding to torque to be output from the electric motor (not illustrated), the MCU 120 may control the torque of the electric motor based thereon. In the present embodiment, in particular, regenerative torque control may be performed to control deceleration through regenerative braking.

The brake lamp 130 may be turned ON or OFF in a deceleration situation due to regenerative braking according to the control of the HCU 110. For example, the brake lamp 130 may be turned ON or OFF according to a brake lamp threshold set or corrected by the HCU 110, that is, deceleration compared to the ON threshold and an OFF threshold.

In the case of an EV rather than a hybrid vehicle, the configuration of FIG. 4 may be modified to be suitable for the EV. The HCU no may be replaced with a vehicle control unit (VCU) in charge of overall control of an electric vehicle powertrain, which is illustrative, and the present invention is not limited thereto.

The term "control unit" forming parts of the names of the MCU, the HCU, etc. is merely a widely used term for the name of a controller that controls a specific function of a vehicle, and does not mean a generic functional unit. For example, each control unit may include a communication device for communicating with another control unit or a sensor to control a function assigned thereto, a memory for storing an operating system or a logic command, input and output information, etc., and one or more processors for performing determination, calculation, decision, etc. necessary for controlling a function assigned thereto.

Before describing each of the elements 111, 113, and 115 of the HCU no in detail, a plurality of regions defined according to a distance from the following vehicle according to the embodiment will be first described.

Figure 5:
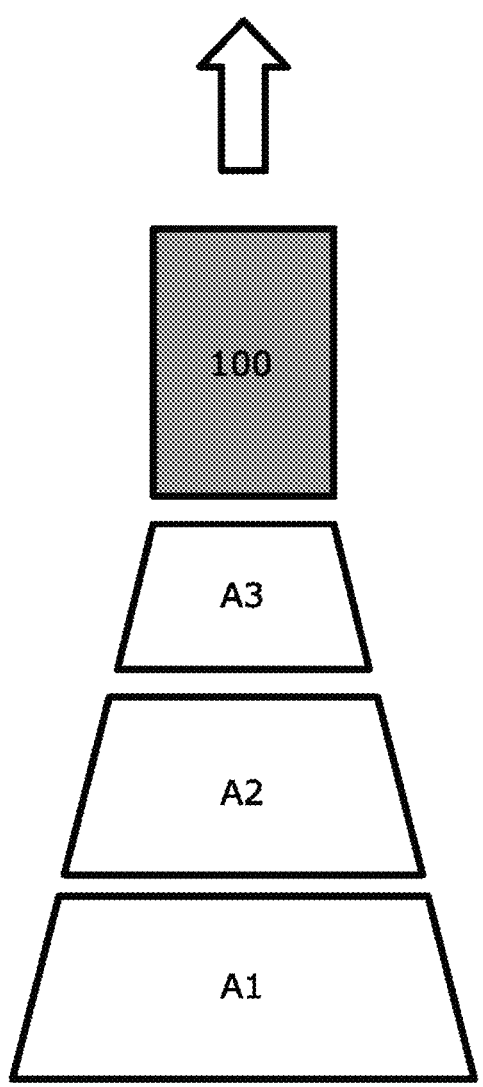
FIG. 5 is a diagram describing a region according to a distance from a rear of a vehicle according to an embodiment of the present invention.

FIG. 5 is a diagram describing a region according to a distance from a rear of a vehicle according to an embodiment of the present invention.

Referring to FIG. 5, a direction of an arrow indicates a driving direction in a drive (D) gear with respect to a vehicle 100 according to the embodiment, and a plurality of regions A1, A2, and A3 is disposed for each distance in the direction opposite the driving direction, that is, rearwards with respect to the vehicle 100.

When another vehicle approaches within the first region A1, which is a region furthest from the rear of the vehicle, brake lamp control according to the embodiment is started. Further, a different type of brake lamp control may be performed for each of the second region A2 located closer than the first region A1 and the third region A3 located closest to the rear of the vehicle.

The shape of each region is illustrated as having a trapezoidal planar shape in FIG. 5. However, the shape is illustrative, and is not intended to be limiting. Obviously, it is possible to set various shapes such as a rectangle and an arc shape. In addition, a relative size of each region or an absolute longitudinal length of each region may be variably set depending on the driving environment. For example, each region may be equally set to have a longitudinal length of 5 m, or may be set to have different longitudinal lengths. In addition, the size of each region may be set to be smaller in an urban area where the vehicle speed is low than in an environment such as a highway where the vehicle speed is high. In addition, the size of each region may be set differently according to road surface conditions. For example, in the case of rain or snow, the size of each region may be enlarged to about 1.5 to 3 times the default size.

The specific manner of brake lamp control in each region will be described along with the operation of each of the elements 111, 113, and 115 of the HCU 110.

First, when the following vehicle enters the first region described with reference to FIG. 5 in a deceleration situation due to regenerative braking, the brake lamp threshold criterion corrector 111 may correct the ON threshold so that the brake lamp may be turned ON even at a deceleration less than a default value. Here, a range of correction does not exceed the OFF threshold, and may be set in various forms. As an example, the ON threshold may be corrected to approach the OFF threshold by a certain ratio of a difference between the ON threshold and the OFF threshold, or may be corrected to approach the OFF threshold by a preset deceleration value. However, the present invention is not limited thereto. As another example, the OFF threshold may be corrected to be higher in correcting the ON threshold. Even in this case, it is preferable that the corrected ON threshold does not exceed the OFF threshold corrected together. However, the corrected ON threshold may exceed the OFF threshold before correction.

When the following vehicle enters the second region closer than the first region, the deceleration torque corrector 113 may control the regenerative braking torque to generate deceleration greater than the ON threshold corrected by the brake lamp threshold criterion corrector 111. Therefore, when the following vehicle enters the second region, the brake lamp may be turned ON.

When the following vehicle enters the third region closer than the second region, the chattering torque corrector 115 may control the regenerative braking torque so that the deceleration changes, thereby causing chattering in the brake lamp according to the OFF threshold and the corrected ON threshold. For example, in the case of intervening in regenerative braking torque control in a situation where the brake lamp is turned ON by control of the deceleration torque corrector 113, the chattering torque corrector 115 may control the regenerative braking torque so that the deceleration becomes lower than the OFF threshold and then becomes higher than the ON threshold again repeatedly within a certain time interval. Accordingly, the brake lamp operates in a chattering pattern that repeatedly flashes within a short time, and through this, it is possible to induce maintenance of a safe distance by attracting the attention of the driver of the following vehicle.

FIG. 6A is a diagram describing a concept of brake lamp control in each region according to an embodiment of the present invention through comparison with a comparative example, and FIG. 6B is a diagram describing deceleration torque control in the second region according to an embodiment of the present invention. In FIGS. 6A and 6B, it is assumed that the vehicle deceleration increases as a graph is directed downward in a vertical axis.

Referring to FIG. 6A, when the following vehicle approaches and enters the first region A1 in a situation in which deceleration is performed according to regenerative braking in the electric vehicle according to the embodiment, the ON threshold is adjusted upwards from a default value (ON threshold β) to an ON threshold β'.

Thereafter, when the following vehicle comes closer and enters the second region A2, the regenerative braking torque (that is, deceleration torque) is controlled to generate deceleration greater than the corrected ON threshold (ON threshold β) and thus the brake lamp may be turned ON.

Here, the deceleration torque control will be described in more detail with reference to FIG. 6B.

Target acceleration for deceleration control may be determined by applying Δ, which is a preset margin by testing, below the ON threshold previously corrected in response to entry into the first region A1. That is, target deceleration $\alpha_{deccel}$ may be obtained by subtracting Δ from the corrected ON threshold $\beta'(\alpha_{deccel}=\beta'-\Delta)$.

Here, Δ may differ according to vehicle speed. For example, Δ may be increased to strengthen turning ON of the brake lamp as the vehicle speed increases. In addition, the deceleration torque ($T_{deccel}$) may be calculated as follows.

$$T_{deccel}=T_{now}+(\alpha_{deccel}-\alpha_{now})*m*R_{wheel} \quad \text{Equation 1}$$

In the above Equation 1, $T_{now}$ denotes a current torque, $a_{now}$ w denotes current acceleration, m denotes the vehicle mass, and $R_{wheel}$ denotes a dynamic radius of a wheel of the vehicle, respectively.

In this instance, when the current acceleration is less than or equal to the target acceleration and the brake lamp is already turned ON, the above-described deceleration torque control may be omitted. However, even when the brake lamp is turned ON, if the current acceleration is higher than the target acceleration (β'>current acceleration>target acceleration), the deceleration torque control may be performed to strengthen turning ON of the brake lamp and control the chattering torque of the third region A3.

Returning to FIG. 6A again, when the following vehicle enters the third region A3 closer than the second region A2, the regenerative braking torque may be controlled so that the deceleration changes to cause chattering in the brake lamp according to the OFF threshold α and the corrected ON threshold β'. That is, in the case of intervening in the regenerative braking torque control in a situation where the brake lamp is turned ON under the control of the deceleration torque corrector 113, the chattering torque corrector 115 first decreases the deceleration to deceleration less than the OFF threshold α to turn the brake lamp OFF, and increases the deceleration again to deceleration greater than the corrected ON threshold IT to turn the brake lamp ON. By allowing such control to be repeated within a predetermined time, the brake lamp may operate in a chattering pattern so as to repeatedly flash. For example, a cycle and blink rate of the chattering torque control typically imitate an operation scheme of an emergency light, and even within the third region A3, the cycle may be corrected according to the distance and relative speed with respect to the following vehicle. That is, as the following vehicle approaches, the cycle may be shortened.

Such control according to the embodiment makes it possible to induce the following vehicle to maintain the safe distance while satisfying regulations as long as each of the thresholds α, β, and β' is set within the regulation standard shown in Table 1.

In contrast, in the comparative example, neither correction of the ON threshold nor control of the deceleration torque is performed. Therefore, unless the vehicle deceleration becomes higher than the ON threshold β set as a default, even when the vehicle is actually being decelerated due to regenerative braking, the brake lamp is not turned ON and remains OFF.

Figure 7:
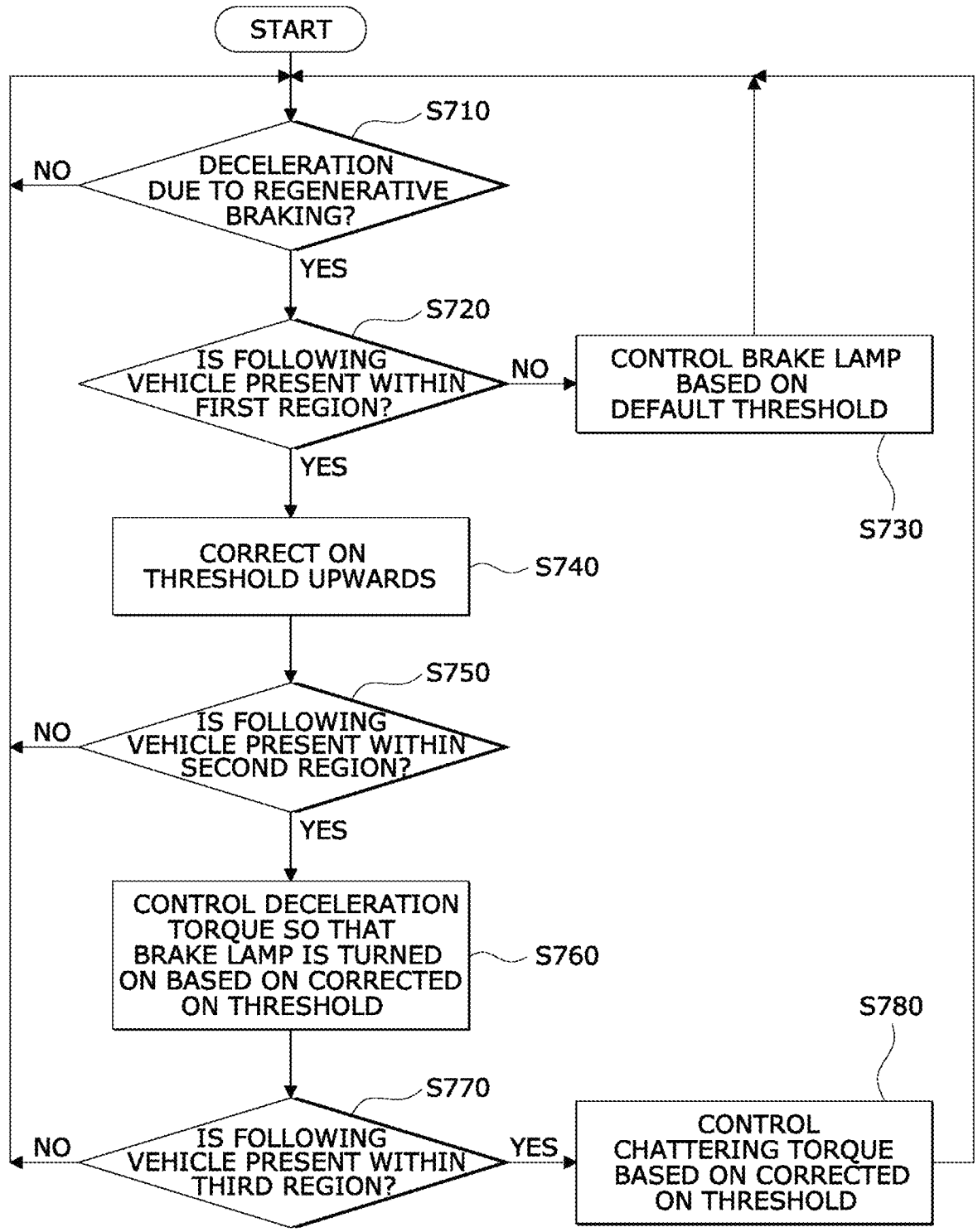
FIG. 7 is a flowchart illustrating an example of a brake lamp control process according to an embodiment of the present invention.

A process of controlling the brake lamp according to the embodiment described above is summarized in a flowchart as illustrated in FIG. 7.

FIG. 7 is a flowchart illustrating an example of a brake lamp control process according to an embodiment of the present invention.

Referring to FIG. 7, when deceleration due to regenerative braking is generated in a coasting situation (that is, without operation of the APS or the BPS) (Yes of S710), a position of another vehicle (that is, the following vehicle) behind the subject vehicle may be determined.

When the following vehicle is not detected or is present outside the first region (No in S720), the brake lamp may be controlled according to the ON threshold set as a default (S730).

Figure 3:
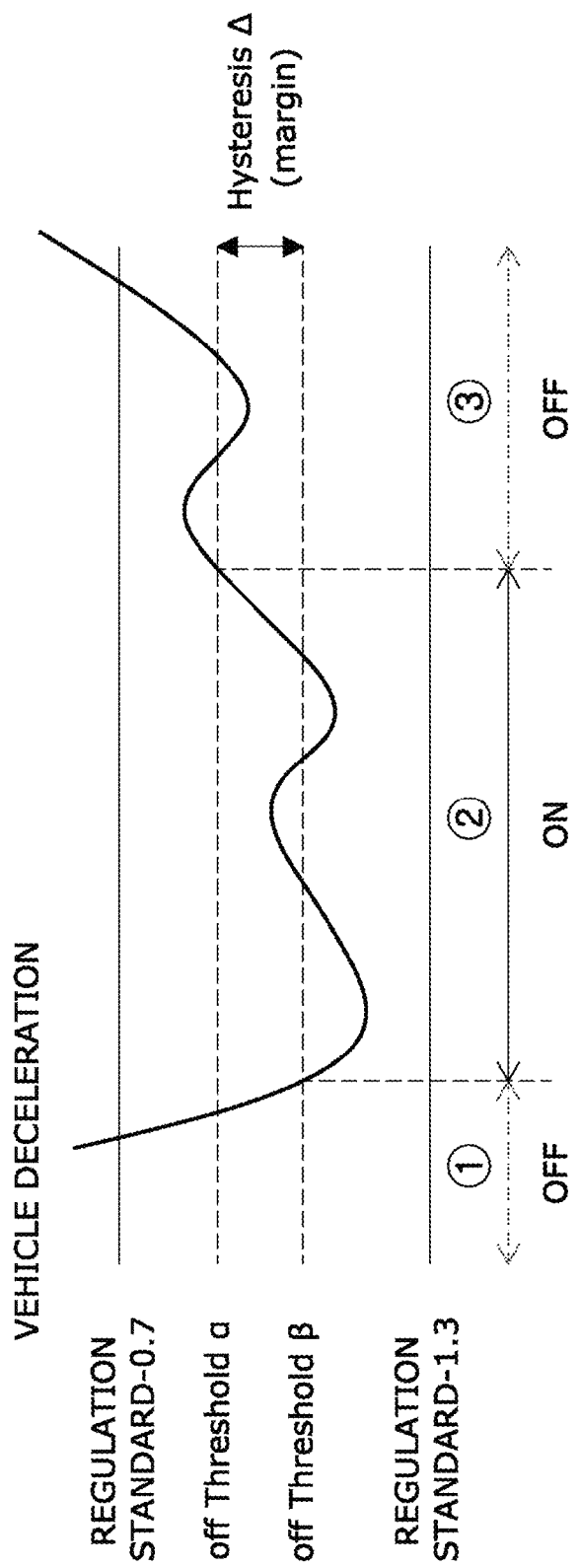

On the other hand, when the following vehicle is present within the first region (Yes in S720), the ON threshold may be corrected upwards so that the brake lamp may be turned ON even at lower deceleration than the default (S740). Here, correcting the ON threshold upwards means that the ON threshold is corrected to have a value closer than the default to the OFF threshold. For example, this expression means vertically (+) upward correction in the graph such as FIG. 3 or FIG. 6, may mean that the value increases (for example, −1->−0.9) in terms of acceleration, and may mean that the value decreases (for example, 1->0.9) in terms of the absolute value of acceleration or deceleration.

In addition, when the following vehicle is present within the second region (Yes in S750), deceleration (regenerative braking) torque control may be performed so that the brake lamp is turned ON at the corrected ON threshold (S760).

In addition, when the following vehicle is present within the third region (Yes in S770), chattering torque control may be performed so that chattering occurs in the brake lamp by repeatedly setting the deceleration higher than the corrected ON threshold and then lower than the OFF threshold (S780).

Figure 2:
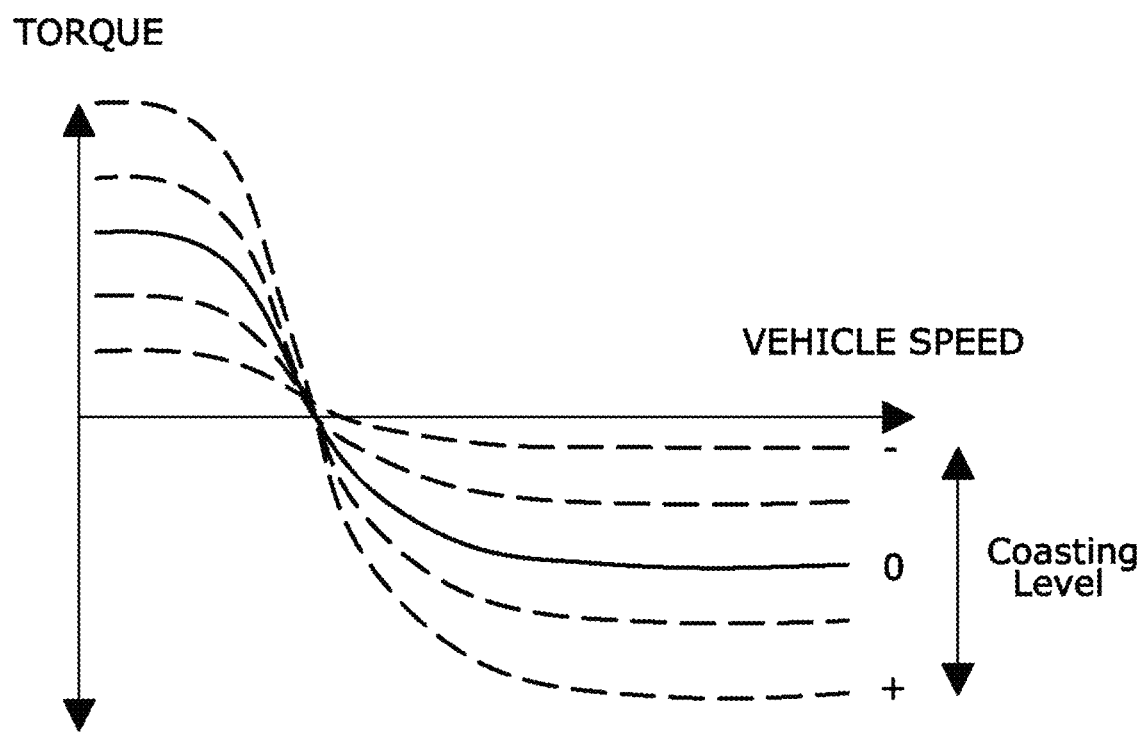
FIG. 2 is a diagram describing the general concept of a coasting level.

The brake lamp control method according to the embodiment described so far may be constantly performed during driving, and may be applied during use of a regenerative braking amount variable setting function using a paddle shift described above with reference to FIG. 2 or a function that allows the driver to variably control the amount of creep torque to be applied during coasting, such as a smart regenerative braking system.

Further, the above-described brake lamp control method may be applied in a manner similar to a baby mode in which acceleration and deceleration is controlled differently depending on whether or not an infant is riding or whether or not a car seat is installed. In addition, in a vehicle that may recognize driving lanes by support of a blind spot detection (BSD) function using a vision sensor, etc., the vision sensor determines whether the vehicle is driving in a first lane, and when another vehicle approaches a rear during driving in the first lane, a driver of the subject vehicle may be made aware that the vehicle approaches the rear by a change in longitudinal acceleration in a form similar to the chattering torque control, thereby inducing the driver to accelerate or change to a second lane. In this instance, by synchronizing a blinking cycle of the brake lamp through chattering torque with a lighting cycle of the emergency light, it is possible to convey regret to a driver of the following vehicle.

The present invention described above may be implemented as computer-readable code on a medium in which a program is recorded. The computer-readable medium includes all types of recording devices in which data readable by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, an optical data storage device, etc.

The vehicle according to at least one embodiment of the present invention configured as described above may effectively control the lighting timing by correcting the ON threshold based on the distance to the following vehicle.

In addition, the vehicle according to at least one embodiment of the present invention may control the deceleration to turn ON the brake lamp in a chattering pattern (that is, intentionally generate chattering).

Therefore, the driver of the following vehicle may effectively be made aware of whether the vehicle is decelerating, and thus may be induced to maintain a safe distance. Further, it is possible to prevent sudden braking by using vehicle motion to alert the driver that the following vehicle is approaching.

The effects obtainable in the present invention are not limited to the above-mentioned effects, and other effects not mentioned may be clearly understood by those of ordinary skill in the art to which the present invention belongs from the above description.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of controlling a brake lamp of a vehicle equipped with an electric motor as a power source, the method comprising:
    determining, by a controller, a position of a following vehicle when decelerating through regenerative braking in a coasting situation;
    performing, by the controller, correction of an ON threshold of deceleration for turning on the brake lamp according to the deceleration in response to the determined position of the following vehicle being in one of a plurality of regions set according to a distance from a rear of the vehicle; and
    performing, by the controller, control of regenerative braking torque in response to the determined position and the corrected ON threshold,
    wherein performing the correction of the ON threshold comprises correcting the ON threshold upwards compared to a default ON threshold in response to the determined position of the following vehicle being within a first region of the plurality of regions.

2. The method according to claim 1, wherein correcting comprises correcting the ON threshold to be closer to an OFF threshold of the deceleration for turning off the brake lamp than the default ON threshold.

3. The method according to claim 1, wherein performing the control of the regenerative braking torque comprises performing, by the controller, control of the regenerative braking torque to ensure that the deceleration is maintained below the corrected ON threshold in response to the determined position of the following vehicle being within a second region of the plurality of regions, the second region being closer to the rear of the vehicle than the first region.

4. The method according to claim 3, wherein performing the control of the regenerative braking torque further comprises controlling the regenerative braking torque to realize a deceleration change causing chattering in the brake lamp according to the corrected ON threshold and the OFF threshold in response to the following vehicle being located within a third region of the plurality of regions, the third region being closer to the rear of the vehicle than the second region.

5. The method according to claim 4, wherein controlling the regenerative braking torque to realize the deceleration change causing the chattering in the brake lamp comprises controlling the regenerative braking torque so that the deceleration becomes higher than the OFF threshold and then becomes lower than the corrected ON threshold repeatedly within a preset time period.

6. The method according to claim 1, wherein sizes of the plurality of regions are based on weather or road surface conditions.

7. The method according to claim 1, wherein the performing of the correction of the ON threshold is executed based on a function enabling variable control of a creep torque during the coasting situation being activated.

8. The method according to claim 7, wherein the function enabling the variable control of the creep torque comprises a regenerative braking amount variable setting function using a paddle shift and a smart regenerative braking function.

9. A computer-readable recording medium recording a program for executing the method according to claim 1.

10. A vehicle comprising:
an electric motor;
a brake lamp;
a rear sensor; and
a controller configured to:
control the brake lamp based on deceleration during regenerative braking through the electric motor in a coasting situation;
determine a position of a following vehicle through the rear sensor in response to the deceleration during the regenerative braking in the coasting situation;
perform correction of an ON threshold of deceleration for turning on the brake lamp according to the deceleration based on the determined position of the following vehicle being within one of a plurality of regions set according to a distance from a rear of the vehicle; and
perform control of regenerative braking torque based on the determined position and the corrected ON threshold,
wherein the controller is configured to correct the ON threshold upwards compared to a default ON threshold set as a default in response to the determined position of the following vehicle being within a first region of the plurality of regions.

11. The vehicle according to claim 10, wherein the controller is configured to correct the ON threshold to be closer to an OFF threshold of the deceleration for turning off the brake lamp than the default ON threshold.

12. The vehicle according to claim 10, wherein the controller is further configured to ensure that the deceleration is maintained below the corrected ON threshold in response to the determined position of the following vehicle being within a second region of the plurality of regions, the second region being closer to the rear of the vehicle than the first region.

13. The vehicle according to claim 12, wherein the controller is further configured to control the regenerative braking torque to realize a deceleration change causing chattering in the brake lamp according to the corrected ON threshold and the OFF threshold in response to the position of the following vehicle being within a third region of the plurality of regions, the third region being closer to the rear of the vehicle than the second region.

14. The vehicle according to claim 13, wherein the controller is further configured to control the regenerative braking torque so that the deceleration repeatedly becomes higher than the OFF threshold and then becomes lower than the corrected ON threshold within a preset time period to realize the deceleration change causing the chattering in the brake lamp.

15. The vehicle according to claim 10, wherein sizes of the plurality of regions are based on weather or road surface conditions.

16. The vehicle according to claim 10, wherein the controller is further configured to perform the correction of the ON threshold or the control of the regenerative braking torque based on a function enabling variable control of a creep torque during the coasting situation being activated.

17. The vehicle according to claim 16, wherein the function enabling the variable control of the creep torque comprises a regenerative braking amount variable setting function using a paddle shift and a smart regenerative braking function.

18. A method of controlling a brake lamp of a vehicle equipped with an electric motor as a power source, the method comprising:
determining a position of a following vehicle in response to deceleration due to regenerative braking being generated in a coasting situation;
in response to the position of the following vehicle being in a first region behind a rear of the vehicle, performing correction of an ON threshold of deceleration for turning off the brake lamp by correcting the ON threshold upwards so that the brake lamp is capable of being turned on at a lower deceleration than a default ON threshold;
in response to the position of the following vehicle being in a second region closer to the rear of the vehicle than the first region, performing the control of regenerative braking torque deceleration torque control to ensure that the deceleration is maintained below the corrected ON threshold;
in response to the position of the following vehicle being in a third region closer to the rear of the vehicle than the second region, performing the control of regenerative braking torque chattering torque control to ensure that the deceleration is repeatedly changed between a value below the corrected ON threshold and OFF threshold so that chattering occurs in the brake lamp; and
in response to the position of the following vehicle being outside the first region, the second region, and the third region, controlling the brake lamp according to the default ON threshold.

* * * * *